Aug. 10, 1965 J. D. MAZGY 3,200,308

CURRENT PULSE GENERATOR EXHIBITING FAST RISE TIME

Filed July 2, 1962

INVENTOR
J. D. MAZGY
BY
E. W. Adams, Jr.
ATTORNEY

United States Patent Office 3,200,308
Patented Aug. 10, 1965

3,200,308

CURRENT PULSE GENERATOR EXHIBITING FAST RISE TIME

James D. Mazgy, Belmar, N.J., assignor to Bell Telephone Laboratories, Incorporated, New York, N.Y., a corporation of New York Filed July 2, 1962, Ser. No. 206,567
4 Claims. (Cl. 317—148.5)

This invention relates generally to current pulse generators and more particularly to a current pulse generator which produces a current pulse exhibiting a fast rise time for use in conjunction with an inductive load such as a magnetic core.

The duration of time during which a direct current will reach its approximate steady state value after the closure of a switch which completes the circuit is commonly known as the "rise time." This rise time is uniquely determined by the values of the resistive and reactive components comprising the circuit. No problem is encountered when the load is primarily resistive since the current reaches the steady state value substantially instantaneously upon the closure of the switch. However, a problem is presented when the load associated with the current generator contains an appreciable amount of inductance. This problem is compounded even further where, according to usual practice, a current limiting device such as a resistor is connected in series with the inductive load to limit the amplitude of the current. In such a case the current will rise exponentially according to the $R/L$ ratio where R is the total resistance in the circuit (in ohms) and L is the total inductance in the circuit (in henrys). (Electric Circuits, M.I.T., John Wiley and Sons, Inc., 1940.)

The problem of rise time becomes extremely acute in circuits provided in computers and similar applications for energizing magnetic memory cores. The current in the primary winding of the memory core must change at a finite rate to produce an output voltage across the load connected to the secondary winding. This rate of change of current with time is determined by the rise time; hence, the speed of producing the output signal is limited by the rise time of the current in the primary winding. Since, in most data systems many memory cores are placed in series, the speed of data processing will be determined, in part, by the rise time of the current in the cores and will thus impose a limit on the over-all speed of operation of the system.

There are many so-called "fast switching networks" wherein a semiconductor device such as a diode or a transistor is utilized to reduce the turn on time of a switch to a minimum value. An effective circuit of this kind is disclosed, for example, in Patent 2,961,553 to A. J. Giger, issude on November 22, 1960, and assigned to the assignee of the present invention. However, this type of circuitry is of no avail when there is inductance in the circuit because, albeit the switch is closed in a minimum interval of time, the current in the completed circuit must still build up according to the above-mentioned exponential relation.

The object of the present invention is to provide a current pulse generator for use in conjunction with an inductive load which will permit an extremely fast rise of current in the load and thereafter maintain the amplitude of the current at the desired steady state value.

In accordance with the above-mentioned object a series circuit is provided comprising a voltage source, a switch, an inductive load and a current limiting device such as a resistor. The principal current path of a blocking oscillator is connected in parallel with the current limiting device and the time constant of the blocking oscillator is chosen to be equal to the time constant of the load. When the switch is initially closed, the current limiting device is shorted by conduction through the blocking oscillator; and substantially all of the voltage from the aforesaid voltage source is applied to the inductive load. Hence, the current in the circuit will rise very rapidly since the resistance contributed by the current limiting device is eliminated. When the current through the load reaches the desired steady state value, the blocking oscillator regeneratively ceases to conduct, thereby effectively reconnecting the current limiting device in the series circuit. Thus, the desired steady state value of the current will be maintained. The insertion of the current limiting device inherently reduces the power dissipation of a transistor used as the switch. Furthermore, no power is consumed in the elements prior to operation of the switch.

The above and other features and objects of the present invention may be more fully appreciated in the light of the following description of an illustrative embodiment taken in conjunction with the drawings in which.

Figures 1, 2, 3:
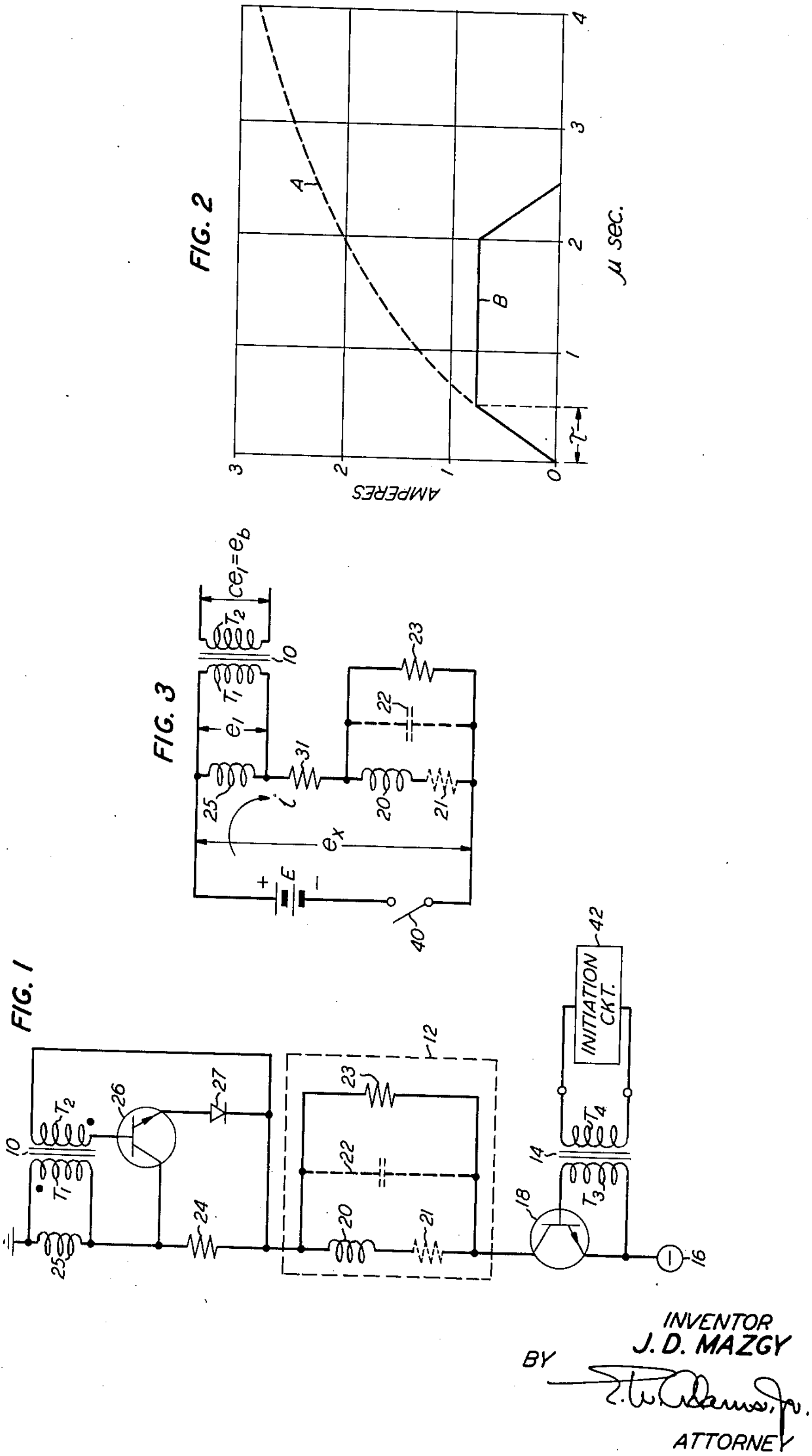
FIG. 1 is a circuit diagram of the current pulse generator of the present invention.
FIG. 2 is a graph illustrating the exponential rise of current in the load circuit of the pulse generator of FIG. 1.
FIG. 3 is a schematic diagram illustrating the equivalent circuit of the pulse generator of FIG. 1.

In the embodiment of the present invention illustrated in FIG. 1, the load, indicated generally by the dashed-line box 12, comprises an inductor 20 and a resistor 23 connected in parallel therewith. It is to be understood that the dotted resistor 21, which is shown connected in series with inductor 20, and the dotted capacitor 22, which is shown connected in parallel with inductor 20 and resistor 21, are not physical elements of load 12 but only represent the characteristics of the load. That is, inductor 20 has an intrinsic direct-current resistance and the presence of this resistance is indicated by resistor 21. Likewise, the lead capacitance caused by the connections to the load terminals is represented by capacitor 22. Resistor 23 is utilized, in the well-known manner, to damp out oscillations in the load. Thus, although the load will be described hereinbelow by referring only to the physical elements which comprise it, it is to be understood that this description also encompasses the elements shown dotted.

One terminal of inductor 20 is connected to the series circuit comprising a current limiting resistor 24 and an inductor 25. The collector of a transistor 26 is connected to the junction betwen resistor 24 and inductor 25 and the emitter of transistor 26 is connected to the anode of a diode 27, the cathode of which is connected to the junction between resistor 24 and inductor 20. The base of transistor 26 is connected to the cathode of diode 27 through the secondary winding $T_2$ of a transformer 10. The primary winding $T_1$ of transformer 10 is connected in parallel with inductor 25. This arrangement will be recognized as a conventional blocking oscillator circuit.

The other terminal of inductor 20 is connected to a switch which, in the embodiment shown, is a transistor switch. Thus, inductor 20 is connected to the collector terminal of a transistor 18. The emitter terminal of transistor 18 is connected to a source of potential 16. The secondary winding $T_3$ of a transformer 14 is connected between the base and emitter terminals of transistor 18. The primary winding $T_4$ of transformer 14 may be connected to an initiation circuit 42 which will apply a voltage to winding $T_4$ when operation of the current generator is desired. The voltage induced in winding $T_3$ will then bias transistor 18 into conduction and thus complete the circuit to allow operation of the current pulse generator. Although a transistor type of switch is indicated in the present embodiment, the invention is not to be thought of as limited to this particular configuration and any type of switch may be used in place of the transistor circuit just described.

Normally and in the absence of the action of the blocking oscillator including transistor 26, if transistor 18 is turned "on," or made conducting, the current will build up exponentially in the load as determined by the values of inductors 20 and 25 and resistors 24 and 21, as shown below. That is, the time constant of the circuit would be uniquely determined by the ratio of $L/R$. If, however, resistor 24 was removed from the circuit during the interval the current increased to the steady state value, the current would rise at a much faster rate since the voltages across inductances 20 and 25 would be substantially increased. Thus, the present invention essentially removes resistor 24 until the current reaches the desired amplitude at which time the resistor is reinserted into the circuit to limit the current to this amplitude.

When initiation circuit 42 applies a voltage to winding $T_4$, a voltage is induced in winding $T_3$ appropriately poled to cause the base of transistor 18 to become positive with respect to the emitter and the transistor conducts. This action thus effectively impresses source 16 across the series circuit comprising load 12, resistor 24 and inductor 25. The voltage drop across resistor 24 causes a bias to exist betwen the collector and emitter of transistor 26. Furthermore, the voltage impressed across inductor 25 and winding $T_1$ of transformer 10 applies a bias to the base of transistor 26 through the action of transformer 10. These operations drive transistor 26 into saturation. Thus, resistor 24 will be effectively removed from the circuit since the total resistance at this point becomes the parallel value of resistor 24 and the saturated direct-current resistance of transistor 26 (which may be more than an order of magnitude smaller than resistor 24).

Since resistor 24 is effectively removed from the circuit the current rises as illustrated by curve A shown in FIG. 2. As the current through inductor 25 increases, the voltage across the inductor decreases. This decrease in voltage causes a decrease in the base bias of transistor 26 due to the action of transformer 10. When the voltage decreases past the value necessary to sustain transistor 26 in conduction, the transistor will effectively "open-up," thereby allowing resistor 24 to limit the current in the circuit. (Diode 27 protects transistor 26 from surges of voltage produced when the field in $T_2$ collapses.) If the time interval between circuit operation and the cut off of transistor 26 is made equal to the time constant of the load by appropriate choice of the blocking oscillator parameters, resistor 24 will be placed in the circuit just at the moment the current in the load reaches the normal steady state value. Thus, as shown by curve B in FIG. 2, at the time $\tau$ the current is limited to the desired value rather than following the exponential rise dictated by curve A.

An analysis of the circuit illustrated in FIG. 1 discloses that the interval during which transistor 26 conducts is a function of the value of inductor 25. FIG. 3 illustrates the equivalent circuit of the generator shown in FIG. 1. The resistor 31 represents the parallel resistance of transistor 26, when in the saturated state, and resistor 24. Transistor switch 18 is indicated as an ordinary switch 40 rather than as the transistor switch shown in FIG. 1 since this has no bearing on the final result. It is assumed that the time taken to charge capacitor 22 is at least an order of magnitude shorter than the time for current to reach a constant value through the series circuit of inductor 20 and resistor 21 and therefore the effect of capacitor 22 may be neglected. Likewise the effect of resistor 23 on the current rise may be neglected since this is a pure resistance. Thus:

$$E-V_{40}=e_x \tag{1}$$

$$i=e_x/R_T\left[1-\epsilon-\frac{R_T}{L_{20}+L_{25}}t\right] \tag{2}$$

where $E$=the voltage of the source
$V_{40}$=the voltage drop across switch 40
$i$=the transient current in the circuit
$R_T$=the value of $R_{31}$ and the value of $R_{21}$ in ohms
$L_{20}$, $L_{25}$=the values of inductors 20 and 25, respectively, in henrys
$e_1$=the voltage impressed across $T_1$
$C$=the transformer constant
$e_b$=the voltage induced in $T_2$ $$e_1=L_{25}\frac{di}{dt} \tag{3}$$

$$=-L_{25}\frac{e_x}{R_T}\frac{R_T}{L_{20}+L_{25}}\epsilon-\frac{R_T}{L_{20}+L_{25}}t$$

$$=\frac{-L_{25}e_x}{L_{20}+L_{25}}\epsilon-\frac{R_T}{L_{20}+L_{25}}t$$

$$e_b=Ce_1=\frac{-CL_{25}e_x}{L_{20}+L_{25}}\epsilon-\frac{R_T}{L_{20}+L_{25}}t$$

$$\ln\frac{L_{20}+L_{25}}{-CL_{25}e_x}e_b=-t\frac{R_T}{L_{20}+L_{25}}\ln\epsilon$$

$$t=\tau=\ln\left[\frac{L_{20}+L_{25}}{-CL_{25}e_x}e_b\right]$$

$$\frac{-R_T}{L_{20}+L_{25}}\ln\epsilon \tag{4}$$

(Details of the derivation of Equations 2 and 3 may be found by reference to the aforementional book.)

It is therefore seen that the time of conduction of transistor 26 may be discretely controlled by the value of inductor 25. Thus the value of $L_{25}$ may be found by setting Equation 4 equal to the rise time of the load and inserting the known quantities.

What is claimed is:

1. A current pulse generator for an inductive load, comprising a current limiting resistor connected in series circuit with said inductive load, a source of potential means including a switching element connected serially between said source and said series circuit for applying said potential to said circuit to initiate a current pulse, and a blocking oscillator having a principal current path connected in parallel with said current limiting resistor and in series between said potential applying means and said load, said blocking oscillator being adapted to promote current initially in said principal current path after application of said potential to said series circuit, said blocking oscillator including means for terminating current in said principal current path in response to a peak value of load current immediately following a substantial rate of rise of said load current, said current-limiting resistor having a resistance effective upon said termination to stabilize said load current at said peak value.

2. In combination, a series circuit comprising inductance and resistance, a source of potential, a first transistor adapted to be a switch between said source and said series circuit, a second transistor having base, emitter and a collector electrodes, said emitter and collector electrodes being connected across a portion of said ressitance to short out said portion of said resistance when said transistor is saturated, and means for forward biasing said base and emitter elctrodes in substantial proportion to the rate of increase of current of one polarity in said inductance, said transistor becoming unsaturated for a value of rising current between said collector and emitter electrodes that is limited by the forward bias of said base and emitter electrodes, said portions of said resistance being proportionoed to stabilize the current in said inductance at said value of current at which said transistor becomes unsaturated.

3. A current pulse generator comprising an input including a transistor switch, an output including an inductive load, a transistor having collector, emitter and base electrodes, an inductor connected serially with said output and said collector and emitter electrodes across said input, a transformer having a first winding connected in parallel with said inductor and a second winding connected between said base and emitter electrodes in a polarity to apply the voltage across said inductor to forward-bias the base and emitter electrodes of said transistor in substantial proportion to the rate of current increase in said output, said rate of increase determining the peak value of output current in response to which said transistor develops substantial impedance between said collector and emitter electrodes, and a resistance element shunting said collector and emitter electrodes, said element having a resistance proportioned to stabilize said output current at said peak value.

4. In combination, a source of voltage, an inductive load circuit, a semi-conductor switch connected between said source and said load circuit, a current-limiting resistor and current-differentiating inductor connected serially between said source and said load circuit, a transistor having collector, emitter and base electrode, said collector and emitter electrodes being connected across said current-limiting resistor to present an impedance at least an order of magnitude lower than said current-limiting resistor when said transistor is in a saturated state, a transformer having a primary winding connected across said current-differentiating inductor and having a secondary winding connected across said base and emitter electrodes in a polarity to forward-bias said transistor while current is increasing in said inductor, wherby said transistor is regeneratively driven into saturation when said semiconductor switch is closed, said current-differentiating inductor and said transformer being adapted to remove said transistor from saturation regeneratively at a maximum current between said collector and emitter electrodes that is immediately preceded by a substantially linear rate of charge of current in said inductor, the sum of the resistances of said current-limiting resistor and said inductive load circuit being adapted to maintain the current in said load circuit at the value of load current corresponding to said maximum current between said collector and emitter electrodes.

References Cited by the Examiner

UNITED STATES PATENTS

| | | | |
|---|---|---|---|
| 2,964,651 | 12/60 | Thomas. | |
| 3,021,454 | 2/62 | Pickens | 317—148.5 |
| 3,078,393 | 2/63 | Winston | 317—148.5 X |
| 3,084,310 | 4/63 | Schurr. | |
| 3,116,441 | 12/63 | Gieffers | 317—148.5 |

SAMUEL BERNSTEIN, *Primary Examiner.*